Dec. 10, 1929.                D. S. TAYLOR                1,738,805
                          ENGINE REAR SUPPORT
                         Filed March 11, 1927

Inventor
Donald S. Taylor
By Blackmore, Spencer & Finch
Attorneys

Patented Dec. 10, 1929

1,738,805

UNITED STATES PATENT OFFICE

DONALD S. TAYLOR, OF PLEASANT RIDGE, MICHIGAN, ASSIGNOR TO GENERAL MOTORS CORPORATION, OF DETROIT, MICHIGAN, A CORPORATION OF DELAWARE

ENGINE REAR SUPPORT

Application filed March 11, 1927. Serial No. 174,603.

This invention relates to the mounting of an internal combustion engine in the chassis frame of a motor vehicle or the like.

The customary power plant of an automobile consists of a multi-cylinder explosive engine, with a flywheel and clutch at the end of the crank-shaft, together with change speed gearing, all associated one beyond another as a single unit. The running gear is connected thru a propeller shaft with the variable or change speed gearing. In the attempt to stabilize the engine against vibratory reactions due to inherent unbalanced forces incident to engine operation, especially in the case of four cylinder engines, the entire power unit is supported in the chassis frame at the front and rear of the engine, with the result that the total mass and weight of the clutch and variable speed gearing is located outside or beyond the supports. This serves somewhat as a counterbalance against engine vibration, and the center of percussion in such case, is located adjacent to or just beyond the rear of the transmission casing.

It has been found that an additional support at the end of the transmission casing exhibits a lack of torque control, while one removed from the rear end of the casing and adjacent the rear engine support controls torque reactions but fails to check vibrations. However, the location of the additional support at an intermediate point serves to minimize the reactions and more completely stabilize the engine in the chassis frame. The present invention, therefore, contemplates the provision of an auxiliary transverse plate-like cross member interposed between the clutch housing and variable speed control housing, with its ends secured to the longitudinal side members of the chassis frame, supplementary to the engine supports, for the purpose of rendering the assembly less susceptible to vibratory and torque reactions.

Figure 1:
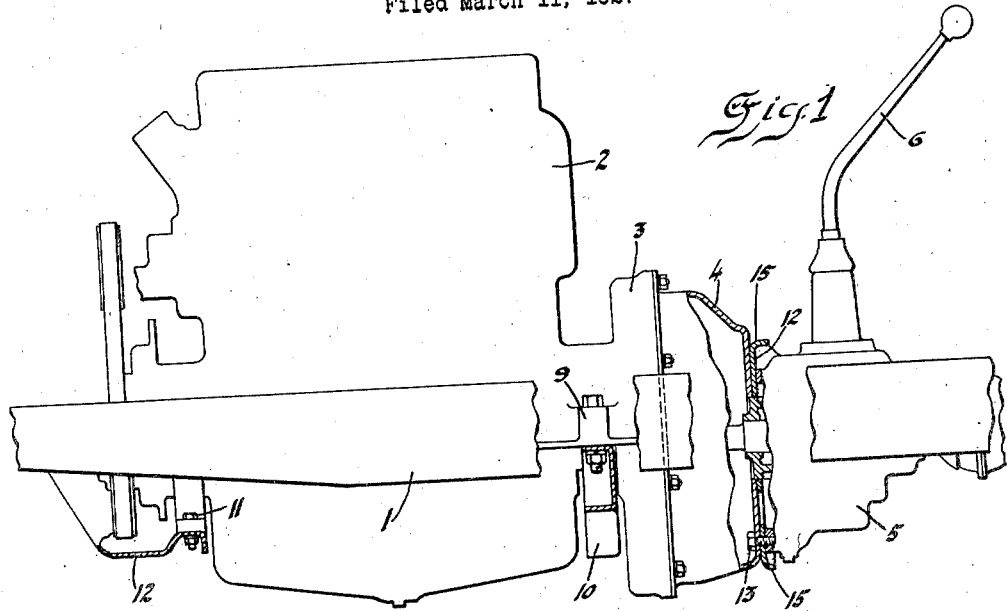
Figure 2:
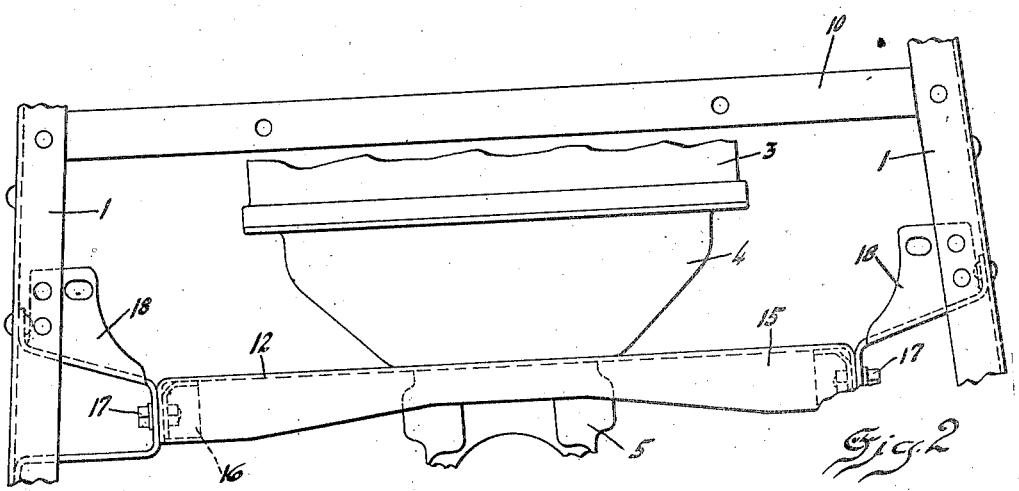
Figure 3:
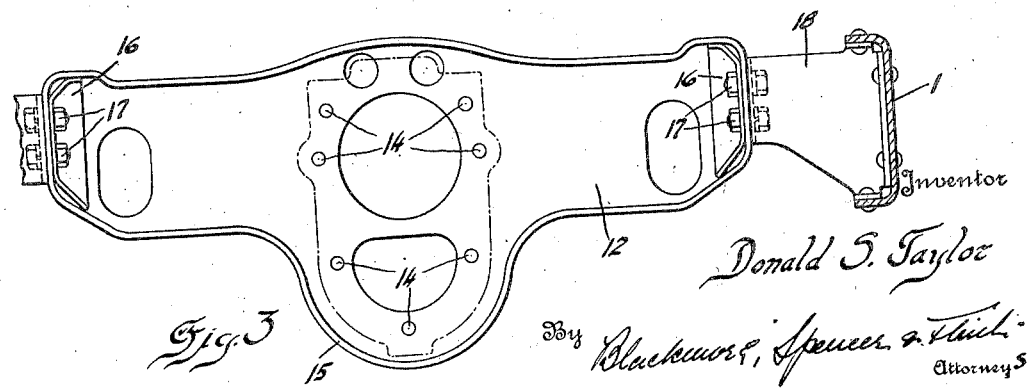

In the accompanying drawing of a preferred, but not necessarily the only embodiment of the invention, Figure 1 is a side elevation of a power plant suspended on an automobile chassis frame, with portions broken away to illustrate the relative location of parts; Figure 2 is a fragmentary top plan view and Figure 3 is a rear elevation, showing the auxiliary cross member in detail.

Referring to the drawing, the reference numerals 1—1 indicate a pair of longitudinal chassis frame side members, which support therebetween the power unit, consisting of the engine, clutch and change speed mechanism. The engine block 2 has an enlarged part 3, which together with the member 4 bolted thereto, forms a housing for the flywheel and clutch. To the rear face of the member 4 is secured the housing 5 for the change speed gearing, the change speed mechanism being controlled by a shift lever 6, projecting thru the top of the housing 5 and extending upward to a convenient point beside the driver's seat.

The rear of the engine 2 is provided on either side, with attachment ears or lugs, as shown at 9, for bolting to a transverse channel bar 10, carried by the side member 1—1, and on which the engine rests. The front of the engine is preferably bolted as at 11 at a single central point to the transverse cross member 12. The construction thus far described is a three point suspension arrangement that has gone into extensive use, and is found to be quite desirable due to the fact that frame weaving is not readily imparted to the engine and the transmission of vibrations thru the frame and body is greatly reduced. The inherent engine vibrations which exhibit themselves in mountings of this character, have but a small range of movement, the amplitude usually being of only a few thousandths of an inch, but they are of frequent occurrence. While these small amplitude, high frequency vibrations are more or less negligible, they may become objectionable in that undue wear and breakage of parts sometimes results or sympathetic vibrations of other parts occur, setting up disagreeable sounds and annoying noises. In addition to these objections, the length of the shift lever 6 causes its upper end to be carried thru such a range of movement as to become perceptible, both to the eye and also to the hand of the driver when the shift lever is manipulated.

In order to further reduce and minimize the vibrations, a stamped cross member 12 is interposed between adjacent faces of the clutch housing and change speed gearing housing, being secured by the same bolts 13 which connect the housings to each other. Any suitable number of such fastening bolts 13 may be employed, corresponding holes 14 being provided in the web of the cross member as is illustrated in Figure 3. Figure 3 further illustrates by broken lines the outline of the abutting face of the housing 5, the web of the member 12 being enlarged at this central point. A reinforcing marginal flange 15 may be provided, preferably extending completely around the edge of the cross member. The lateral flange at the end of each arm of the cross member, is reinforced by a stamping 16 welded in place, and fastening bolts 17 secure the flanges to brackets 18, carried by the frame. In assembly, the member 12 is first interposed between the housings and the power unit is then secured in the frame as a whole.

This cross member 12 possesses a certain amount of flexibility which permits it to yield to relative movements of the side frame members, so that frame weaving does not materially affect the power unit, while at the same time the cross member effectually braces the parts of the unit beyond the rear engine support against the vibration heretofore mentioned.

Having described my invention, I claim:

1. In a motor vehicle, the combination of a chassis frame, an engine, means to support the engine in the frame, drive mechanism associated with the engine and projecting beyond said supporting means including a clutch and change speed mechanism, and a cross bar interposed between and secured to the clutch and change speed mechanism and having its ends secured to the frame, for rigidly bracing the drive mechanism against vibration.

2. In a motor vehicle, the combination of a chassis frame, an engine supported adjacent the front and rear thereof on said frame, clutch and variable speed control mechanism associated with the engine beyond the rear engine support, a housing for the clutch mechanism secured to the engine, a housing for variable speed control mechanism, and a plate-like member interposed and held between said housings and having its ends attached to the chassis frame to rigidly brace said parts.

3. In a motor vehicle, the combination of a chassis frame, a power unit, including an engine, a clutch and variable speed control mechanism, coupled one beyond the other, members supporting the unit on the frame and located respectively between the variable speed control mechanism and the clutch and at the front and at rear of the engine.

4. In a motor vehicle, the combination of a chassis frame, including longitudinal and transverse members, an engine supported by a pair of transverse frame members at the front and rear thereof, a clutch housing secured to the engine beyond the engine supporting frame members, a housing for variable speed control mechanism secured to the clutch housing, and a plate-like cross member independent of the transverse frame members on which the engine is supported having an enlarged central portion interposed and rigidly held between said housings and having lateral arms fixedly secured to the longitudinal frame members.

5. In a motor vehicle, the combination with a pair of longitudinally extending chassis frame members, and a power unit including an engine, a clutch and transmission, of a pair of transverse frame members located respectively at the front and rear of the engine on which said engine is supported, and an auxiliary cross member located between the clutch and transmission to brace the same against vibrations.

In testimony whereof I affix my signature.

DONALD S. TAYLOR.